United States Patent [19]
Walter et al.

[11] Patent Number: 5,541,857
[45] Date of Patent: Jul. 30, 1996

[54] PROCESS AND DEVICE FOR MONITORING VIBRATIONAL EXCITATION OF AN AXIAL COMPRESSOR

[75] Inventors: Hilger A. Walter, Stade; Herwart Hönen, Uebace-Palenberg; Heinz E. Gallus, Aachen, all of Germany

[73] Assignee: Dow Deutschland Inc., Germany

[21] Appl. No.: 246,886

[22] Filed: May 20, 1994

Related U.S. Application Data

[63] Continuation-in-part of PCT/US93/05766 filed Jun. 16, 1993.

[30] Foreign Application Priority Data

Aug. 10, 1992 [EP] European Pat. Off. ............. 92113606

[51] Int. Cl.$^6$ ............................ G01H 3/00; G01M 7/00; F03B 15/00
[52] U.S. Cl. .................... 364/558; 364/508; 364/431.02; 73/660; 415/26
[58] Field of Search ............................. 364/558, 431.02, 364/505, 508, 494; 73/116, 660; 417/20, 43; 415/26; 60/39, 29

[56] References Cited

U.S. PATENT DOCUMENTS

| | | | |
|---|---|---|---|
| 3,003,970 | 10/1961 | Call | 252/152 |
| 3,132,562 | 5/1964 | Frevel | 89/1.7 |
| 3,216,244 | 11/1965 | Borchers | 73/115 |
| 3,244,006 | 4/1966 | Delmonte | 73/398 |
| 3,259,650 | 7/1966 | Decker et al. | 260/515 |

(List continued on next page.)

FOREIGN PATENT DOCUMENTS

| | | |
|---|---|---|
| 0024823 | 3/1981 | European Pat. Off. . |
| 0465696 | 1/1992 | European Pat. Off. . |
| 2248427 | 5/1975 | France . |
| 2049338 | of 0000 | Germany . |
| 3605958 | 9/1987 | Germany . |
| 57-129297 | 8/1982 | Japan . |
| 2191606 | 12/1987 | United Kingdom . |

OTHER PUBLICATIONS

*Combusion and Flame*, vol. 25, No. 1, 1 Aug. 1975, New York, pp. 5–14, Y. Mizutani et al., "A Study on the Structure of Premixed Turbulent Flames by the Microphone–Probe Technique", p. 6–7.
Int'l Patent Appl. No. PCT/US93/05765, filed Jun. 16, 1993, European Patent Appl. No. 92113607.3, filed Aug. 10, 1992,
Int'l Patent Appl. No. PCT/US93/05764, filed Jun. 16, 1993.
European Patent Appl. No. 92113586.9, filed Aug. 10, 1992.
Int'l Patent Appl. No. PCT/US93/05766, filed Jun. 16 1993.
European Patent Appl. No. 92113606.5 filed Aug. 10, 1992.
Int'l Patent Appl. No. PCT/US93/05768, filed Jun. 16, 1993.
European Patent Appl. No. 92113585.1, filed Aug. 10, 1992.
"Fast Response Wall Pressure Measurement as a Means of Gas Turbine Blade Fault Identification", K. Nathioudakis et al., Gas Turbine & Aeroengine Congress Expo, Brussels, Belgium, Jun. 11–14, 1990, ASME Paper No. 90–GT. 341.
"Rotating Waves as a Stall Inception Indication in Axial Compressors", V. H. Garnier et al., Gas Turbine & Aeroengine Congress and Expo, Brussels, Belgium ASME paper No. 90–GT–156.
Hönen, Herwart, "Experimental Studies of the Three–Dinemsional Unsteady Flow Behavior in a Subsonic Axial Compressor Stage," Jun. 24, 1987.

*Primary Examiner*—Emanuel T. Voeltz
*Assistant Examiner*—Eric W. Stamber
*Attorney, Agent, or Firm*—Dale H. Schultz

[57] ABSTRACT

A process and a computer implemented system for monitoring vibration in the blades of the rotor and stator of an axial compressor through measurement of pressure fluctuations of the dynamic pressure field in the region of the compressor housing in at least one stage of the compressor by means of at least one pressure sensing device sensitive to differential pressure fluctuations affecting the blades at the characteristic frequency of the stage. The process and computer implemented system also assist in the control of the compressor by forwarding a status respecting rotor and stator mechanical vibration to the control unit.

42 Claims, 5 Drawing Sheets

U.S. PATENT DOCUMENTS

| | | | |
|---|---|---|---|
| 3,468,322 | 9/1969 | Katzer | 137/1 |
| 3,581,572 | 6/1971 | Frick | 73/406 |
| 3,679,382 | 7/1972 | Cohrs et al. | 44/7 |
| 3,820,963 | 6/1974 | Moore et al. | 44/62 |
| 3,963,367 | 6/1976 | Stalker et al. | 415/17 |
| 4,026,111 | 5/1977 | Matthews | 60/641 |
| 4,052,857 | 10/1977 | Altschuler | 60/641 |
| 4,055,994 | 11/1977 | Roslyng et al. | 73/116 |
| 4,058,015 | 11/1977 | Stode | 73/395 |
| 4,072,619 | 2/1978 | Williams et al. | 252/47.5 |
| 4,196,472 | 4/1980 | Ludwig et al. | 364/431 |
| 4,216,672 | 8/1980 | Henry et al. | 73/115 |
| 4,252,498 | 2/1981 | Radcliffe et al. | 415/26 |
| 4,256,511 | 3/1981 | Atchison et al. | 134/46 |
| 4,311,040 | 1/1982 | Long | 73/115 |
| 4,322,977 | 4/1982 | Sell et al. | 73/701 |
| 4,364,266 | 12/1982 | Williams | 73/115 |
| 4,414,817 | 11/1983 | Jernigan | 60/641.2 |
| 4,422,125 | 12/1983 | Antonazzi et al. | 361/283 |
| 4,422,333 | 12/1983 | Leon | 73/660 |
| 4,422,335 | 12/1983 | Ohnesorge et al. | 73/724 |
| 4,434,664 | 3/1984 | Antonazzi et al. | 73/701 |
| 4,449,409 | 5/1984 | Antonazzi | 73/724 |
| 4,457,179 | 7/1984 | Antonazzi et al. | 73/701 |
| 4,500,500 | 2/1985 | Paalman et al. | 423/224 |
| 4,528,817 | 7/1985 | Jernigan | 60/641.2 |
| 4,604,702 | 8/1986 | Zwicke | 364/431.02 |
| 4,618,856 | 10/1986 | Antonazzi | 340/626 |
| 4,625,280 | 11/1986 | Couch | 364/431.02 |
| 4,629,608 | 12/1986 | Lampton, Jr. et al. | 423/226 |
| 4,648,711 | 3/1987 | Zachary | 356/44 |
| 4,808,235 | 2/1989 | Woodson et al. | 134/22.19 |
| 4,902,563 | 2/1990 | McCullough, Jr. et al. | 428/284 |
| 4,921,683 | 5/1990 | Bedell | 423/235 |
| 4,926,620 | 5/1990 | Donle | 55/89 |
| 4,978,571 | 12/1990 | McCullough, Jr. et al. | 428/263 |
| 4,989,159 | 1/1991 | Liszka et al. | 364/508 |
| 4,995,915 | 2/1991 | Sewell et al. | 134/22.14 |
| 5,165,845 | 11/1992 | Khalid | 415/17 |
| 5,375,412 | 12/1994 | Khalid et al. | 60/39.29 |
| 5,394,330 | 2/1995 | Horner | 73/116 |
| 5,400,256 | 3/1995 | Beale et al. | 364/508 |

5,541,857

PROCESS AND DEVICE FOR MONITORING VIBRATIONAL EXCITATION OF AN AXIAL COMPRESSOR

CROSS-REFERENCE TO RELATED APPLICATION

This application is a continuation-in-part application of International Patent Application No. PCT/US93/05766 which was filed on Jun. 16, 1993, and which designates the United States of America, and which claims International Priority from European Pat. Application No. 92113606.5 which was filed on Aug. 10, 1992.

FIELD OF THE INVENTION

The present invention relates to a process and a device for monitoring and controlling vibrational excitation of an axial compressor, said compressor comprising a rotor and a housing, said rotor being rotatably mounted within said housing for rotation about a rotational axis with variable or constant rotational speed, said compressor further comprising at least one compressor stage, each of said at least one stages comprising a row of rotor blades mounted on said rotor and being arranged one following the other in a circumferential direction with respect to said rotational axis and of a row of stator blades mounted on said housing and being arranged one following the other in a circumferential direction with respect to said rotational axis.

The invention provides for monitoring of vibrational excitations of either multi- or single stage compressors with the possibility of being able to control the compressor in accordance with the detected vibrational excitations. A compressor may be operated as an isolated unit or in conjunction with a power turbine engine, as would be the case in a power plant operation. The compressor may further be part of a gas turbine used for driving aeroplanes, ships or large vehicles.

BACKGROUND OF THE INVENTION

A compressor consist of a series of rotating or stationary blade rows in which the combination of a rotor (circular rotating blade row) and a stator (circular stationary blade row) forms one stage. Inside the rotor, kinetic energy is transferred to the flowing gas (usually air) by the individual airfoil blades. In the following stator, this energy is manifested as a pressure rise in the gaseous air as a consequence of deceleration of the gaseous flowing air. This deceleration of the gaseous flowing air is induced as a result of the design of the stator section. The pressure ratio (exit pressure/inlet pressure) of a single stage is limited because of intrinsic aerodynamic factors, so several stages are connected together in many turbo compressors to achieve higher pressure ratios than could be achieved by a single stage.

When operating an axial compressor, mechanical vibrations of compressor components, especially of rotor and stator blades, occur. An important cause for these mechanical vibrations are pressure fluctuations within the compressor stages.

The air fluid flow around each blade has an associated boundary layer which covers each blade and coheres to the blade in case of the rotor blades. The flow boundary layer associated with a rotor blade will rotate as an associated entity of the blade as the blade itself rotates. At the downstream edge of each blade, this flow boundary layer melds into an associated flow boundary entity known as, alternatively, the Dellenregion, wake region, or delve region which is characterized by a localized reduction in both pressure and flow velocity. Therefore, each rotor produces at its downstream end a region with periodically changed flow and pressure characteristics at a characteristic frequency. This characteristic frequency is the product of the number of rotor blades and the present rotational speed. The frequency of these rotor-induced pressure fluctuations therefore depends on the rotational speed. The pressure fluctuations of the rotor of one stage interfere with the pressure fluctuations of the rotors of the neighboring stages. When these different rotors have a respectively different number of blades, interference pressure fluctuations are produced with an interference frequency being either the difference or the sum of the characteristic frequencies of these rotors involved.

While both the stator blades and the rotor blades in the compressor are subject to damage from forces associated with vibrational excitation, the rotor blades are especially at risk because of the additional centrifugal forces that can interrelate with those forces caused by vibration. Depending on the blade constructions, at least one resonance frequency of vibrational blade excitation lies between 100 and 1000 Hz. The aforementioned characteristic frequencies will be more than 4000 Hz. when the compressor is operating at its operational rotation rate; the interference pressure fluctuations, however, have 30 frequencies lying between 100 and 2000 Hz. too. Thus, there is the danger that, even in case of very slight variations of the compressor rotational speed during normal operation, the blades will be influenced to vibrate with their basic resonance frequency by the interference pressure fluctuations. The rotor or stator blades may then suffer damage or even break.

Contemporary turbo engines are usually equipped with fuel or energy control systems which measure and output a variety of operating parameters for the overall engine. Included in such control systems are highly accurate pressure sensing devices or systems. For example, pressure measuring systems are described in U.S. Pat. No. 4,322,977 entitled "Pressure Measuring System", filed May 27,1980 in the names of Robert C. Shell, et al; U.S. Pat. No. 4,434,664 issued Mar. 6, 1984, entitled "Pressure Ratio Measurement System", in the names of Frank J. Antonazzi, et al.; U.S. Pat. No. 4,422,335 issued Dec. 27, 1983, entitled "Pressure Transducer" to Ohnesorge, et al.; U.S. Pat. No. 4,449,409, issued May 22, 1984, entitled "Pressure Measurement System With A Constant Settlement Time", in the name of Frank J. Antonazzi; U.S. Pat. No. 4,457,179, issued Jul. 3, 1984, entitled "Differential Pressure Measuring System", in the names of Frank J. Antonazzi, et al.; and U.S. Pat. No. 4,422,125 issued Dec. 20, 1983, entitled "Pressure Transducer With An Invariable Reference Capacitor", in the names of Frank J. Antonazzi, et al.

While a wide variety of pressure measuring devices can be used in conjunction with the present invention, the disclosures of the above-identified patents are hereby expressly incorporated by reference herein for a full and complete understanding of the operation of the invention.

German Pat. Publication (Auslegeschrift) 2049338 discloses the detection of mechanical vibrations of rotor blades. An electromagnetic sensor mounted to the compressor housing detects the passage of rotor blades by magnetic induction. In case of blade vibrations, the signal output of the sensor is a periodic wave with the characteristic frequency, but modulated by the vibrational frequency of the blades. An electronic circuit extracts the modulation wave form from the sensor signal. By this known process, the actual induced mechanical vibrations of a single stage are measured. In cases of a highly resonant vibration excitation with a rapidly increasing vibration amplitude of the blade vibration, it is important that an eventual vibration excitation is detected as early as possible in order to take countermeasures in time. The known method of relying on the detection of mechanical vibrations is not suited to the challenge of early detection of unacceptable conditions since the fundamental causes of the vibrations can be in existence for some time before mechanical vibrations are detectable.

SUMMARY OF THE INVENTION

It is an object of the present invention to provide a process for online monitoring of vibrational excitation of an axial compressor which provides for an early warning of vibrational excitations of compressor components.

It is a further object of the invention to provide a process for monitoring vibrational excitation of an axial compressor which enables prevention of the excitation of mechanical blade vibrations.

Another object of the invention is to provide a process for monitoring vibrational excitation of an axial compressor allowing an online monitoring with fast response, using common calculation techniques for the signal evaluation.

A further object of the invention is to provide a process for controlling an axial compressor such that the compressor can be operated with optimum efficiency near its load limits. One or more of these objects are solved by the process according to the invention, said process comprising the following steps:

a) measuring of pressure fluctuations within at least one of said compressor stages in the region of said housing by means of at least one pressure sensing device, each device delivering a sensor signal, respectively;

b) deriving a frequency signal from each of said sensor signals, said frequency signal being indicative of amplitudes of frequency components of said respective sensor signals in a respective frequency interval;

c) checking whether each of said frequency signals in a predetermined frequency interval comprises at least one excitation peak in a region of at least one critical frequency, and determining at least one peak parameter indicative of the form of said excitation peak, said critical frequency corresponding to resonance vibrational excitation frequencies of compressor components;

d) generating a first status change signal indicative of a change of operational status of said compressor in case of said peak parameter having a value lying beyond a determined value range.

According to the invention, a signal, in the general proximate region of a predetermined critical frequency range is monitored and observed in a continuous manner. In case of an occurrence of a significant shift in the pattern or amplitude of the monitored signal, a status change signal is generated. Thus, pressure fluctuations which are able to induce mechanical blade vibrations are detected as they occur; this is useful since the invention enables identification of undesireable pressure fluctuation prior to the onset of subsequent induced mechanical vibration. It is easy to observe several critical frequencies. Since the pressure fluctuations spread over the whole axial compressor, it is possible to monitor the axial compressor by only one pressure sensing device. The frequency signal may easily be derived from the frequency signals by using common evaluation techniques, for example fast Fourier transformation (FFT) or fast Hartley transformation (FHT). No model calculations are necessary.

For the process according to the invention, only the time varying part of the absolute pressure is of interest. The pressure fluctuations may directly be measured by means of a piezoelectric or piezoresistive pressure sensor, especially a piezocapacitive pressure sensor. Another less preferred pressure sensing device is a strain gauge pressure sensor.

The peak parameter indicative of the form of the characteristic peak may be the peak height. In this case, the parameter is easy to determine and easy to compare with a limit value or with the limits of an allowed region. In order to monitor the mechanical excitation of the most endangered components of the compressor, the critical frequency is defined as a torsional vibration basic frequency or a higher harmonic thereof or/and as a bending vibration basic frequency or a higher harmonic thereof.

In order to obtain observation of the very broad frequency region, the frequency interval is 0 to 20000 Hz. A preferred region of the frequency interval is 100 to 2000 Hz, wherein most excitation frequencies during the operation of the compressor occur. In order to additionally monitor the mechanical vibration excitation of the compressor, at least one mechanical vibration sensing device may be mounted to the housing of the compressor.

To get information concerning the mechanical vibration excitation of the whole compressor, it is preferred to locate the mechanical vibration sensing devices near the axial ends of the housing. Additionally, a second status change signal is generated, indicative of an excess excitation status of said housing in case of said excess excitation status of the housing being detected, thereby giving an additional possibility of determining an excess excitation status of the compressor.

The invention further relates to a process for controlling of an axial compressor, which is based on the above-described process for monitoring of an axial compressor with the additional feature that at least one status change signal derived form said process is used for controlling said axial compressor.

When, during the operation of the compressor, (1) an increase of the excitation peak (lying in a predetermined frequency region) is detected, or, (2) the amount of a vibrational excitation (detected by at least one mechanical vibration sensing device mounted at the housing of the compressor) increases, then either of these increases may be used as an input for controlling the axial compressor in a way to move the operational status of the compressor in a direction where, respectively, (a) the predetermined frequency regions of the frequency signal do not contain any excitation frequencies or (b) no mechanical excitations occur, so that damage of compressor components may be avoided.

The invention further relates to a device for monitoring vibrational excitation of an axial compressor in accordance with the above described process for monitoring vibrational excitation of an axial compressor. The invention also relates to a device for controlling an axial compressor in accordance with the above mentioned process for controlling of vibrational excitation of an axial compressor.

BRIEF DESCRIPTION OF THE DRAWINGS

For a better understanding of the invention, reference is made to the following description and the drawings.

DESCRIPTION OF THE PREFERRED EMBODIMENT

Figure 1:
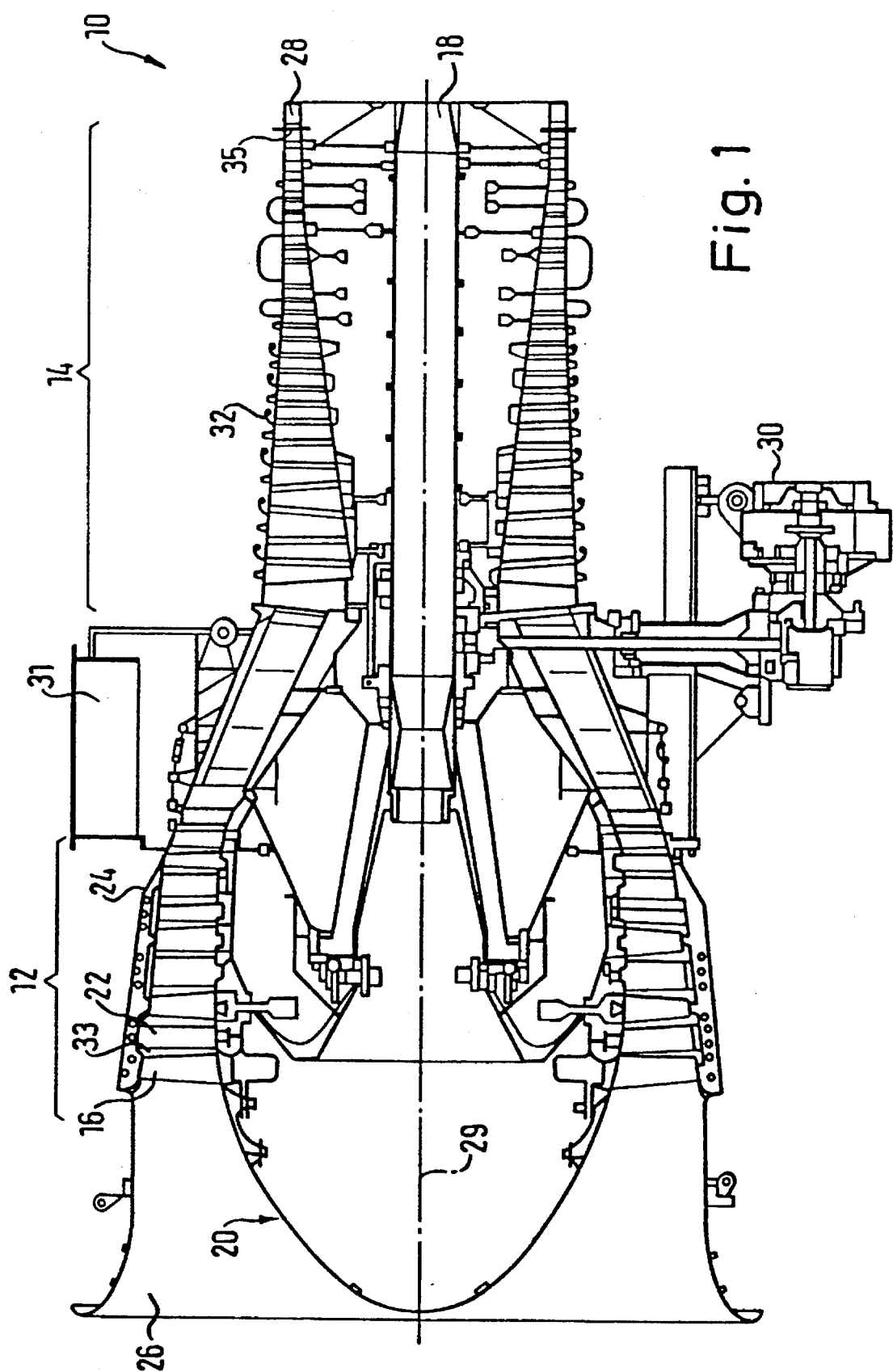
FIG. 1 is a simplified graphic representation of an axial compressor as part of a gas turbine.
Figure 2:
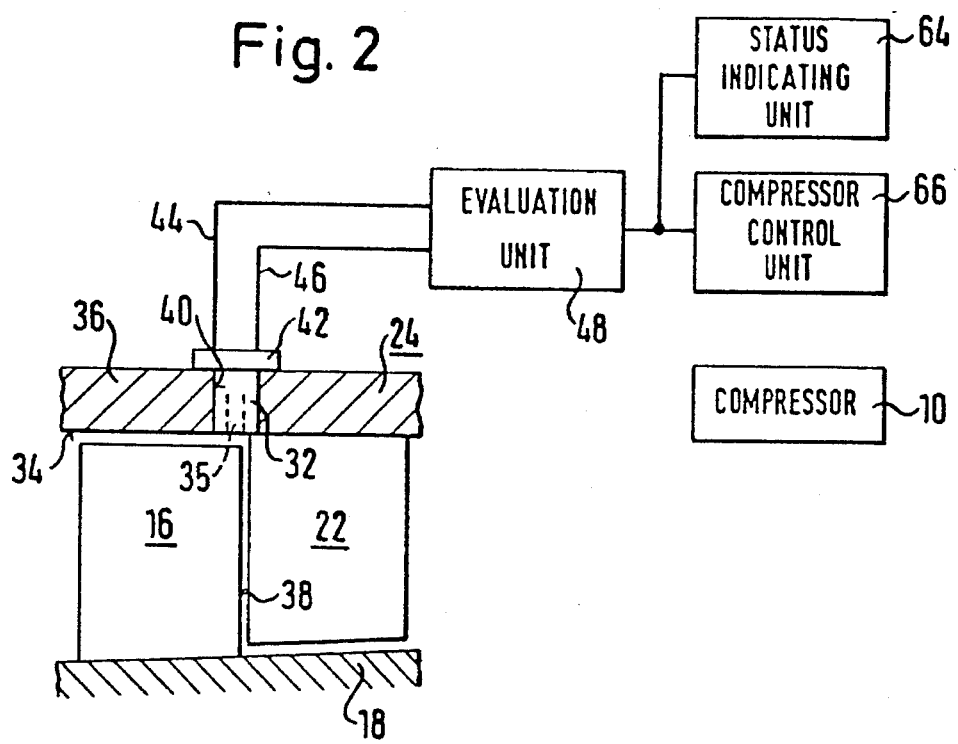
FIG. 2 is a schematic representation of the compressor of FIG. 1, illustrating one compressor stage of the compressor.

Referring to the drawings, wherein equal numerals correspond to equal elements throughout, first reference is made to FIGS. 1 and 2 wherein a typical compressor part of a gas turbine engine is depicted (including the present invention). The compressor 10 is comprised of a low pressure part 12 and a high pressure part 14. Rotor blades 16 of the compressor are mounted on a shaft 18 of a rotor 20. Stator blades 22 (guide vanes) are mounted in a housing (casing) 24 of said compressor 10 and are therefore stationary. Air enters at an inlet 26 of the gas turbine engine and is transported axially to compressor stages of the compressor under increasing pressure to an outlet 28. An axis 30 of said compressor is defined as the axis of rotation of the rotor 20.

Each of the mentioned compressor stages consists of two rows of blades with equal blade number, namely a row of rotor blades 16 and a row of stator blades 22. The blades of each row are arranged one following the other in a circumferential direction with respect to said axis 30. FIG. 2 shows a first compressor stage of the compressor with rotor blades 16 and stator blades 22, which stage may be an intermediate stage in the high pressure part 14 of the compressor 10. The compressor 10, according to FIG. 1, comprises an accessory gear box 30 enabling the adjustment of orientation of blades in order to change the load of the respective stages. FIG. 1 further shows a bleed air 5 collector 31 between the low pressure part 12 and the high pressure part 14. As the compressor, used in connection with the invention, is of common construction, it is not necessary to go into further detail.

According to the invention, a pressure sensing device in form of a dynamic pressure sensor 32 is mounted in the axial gaps between the rotor blades 16 and the stator blades 22 of the intermediate stage in the high pressure part 14 of the compressor 10. According to the most preferred embodiment, shown in FIGS. 1 and 2, this dynamic pressure sensor is mounted in the fourth stage of the high pressure part of compressor 10. An exemplary pressure measuring system is described in PCT Publication (with International Publication No. WO 94/03785 filed Jun. 16, 1994 and published Feb. 17, 1994) titled ADAPTOR FOR MOUNTING A PRESSURE SENSOR TO A GAS TURBINE HOUSING.

This publication shows a preferred pressure measuring system for use in the invention. Material from this publication is also presented with respect to FIG. 6, FIG. 7, and FIG. 8. An inlet opening 35 of the sensor 32 is flush with an inner circumferential surface 34 of a wall 36 defining said housing 24. Thus sensor 32 measures the pressure fluctuations occurring at the inner circumferential surface 34. Since the sensor 32 is located in the region of the axial gap between the row of rotor blades 16 and stator blades 22, following the rotor blades downstream, the sensor 32 is sensitive for pressure fluctuations occurring in the air flowing through the compressor.

Figure 6:
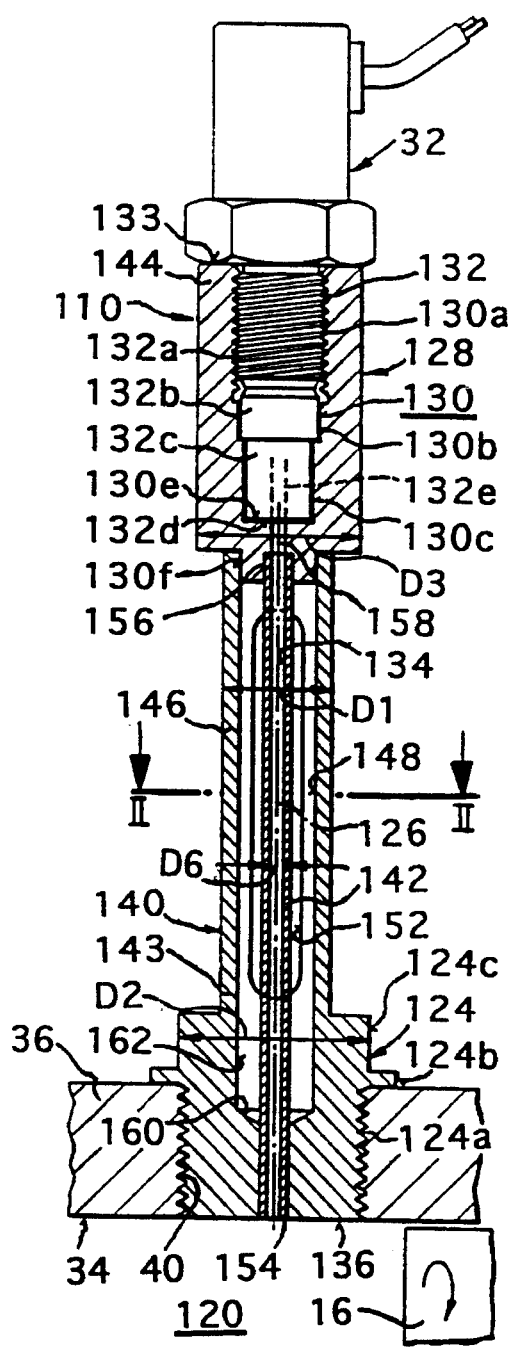
FIG. 6 is an axial cross-section view of an adaptor according to the invention, mounted to a gas turbine wall.
Figure 7:
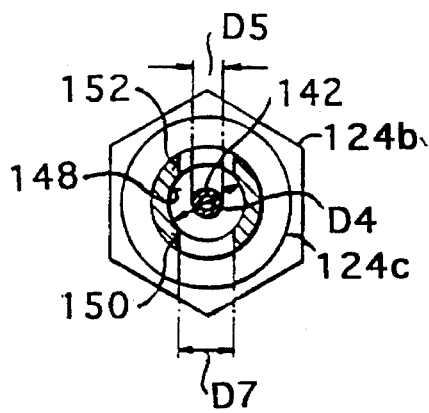
FIG. 7 is a radial cross section of the adaptor as viewed along lines II—II in FIG. 6
Figure 8:
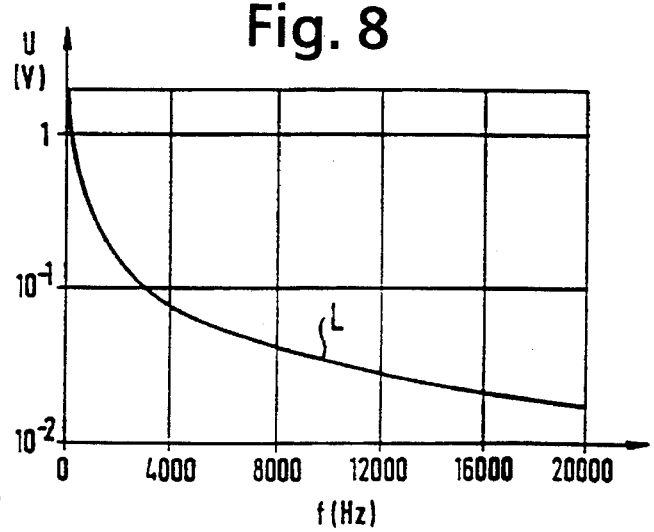
FIG. 8 is a graph showing the dependency of a sensor signal with the frequency of the pressure variations to be measured.

Instead of directly mounting the sensor 32 in an opening 40 (borescope hole), the elongated adaptor disclosed in International Publication No. WO 94/03785 titled ADAPTOR FOR MOUNTING A PRESSURE SENSOR TO A GAS TURBINE HOUSING and also presented with respect to FIG. 6 through 8, can be mounted to the opening 40 to interface the compressor environment to the sensor 32.

The illustrated location of the sensor 32 at the fourth stage of the high pressure part of compressor 10 is preferred, because in this region the danger of blade damaging by vibrational excitation is very high. Additionally in this region, an observation of excitation frequencies in the air flow of the whole compressor may be achieved. Although not illustrated, further pressure sensors may be located in stages lying upstream or downstream of this stage in order to obtain additional information about occurrence of excitation frequencies in the air flow. Dynamic pressure sensors, preferably piezoelectric pressure sensors, are used because of their reliability, high temperature operability and sensitivity for high frequency pressure fluctuations up to 20 000 Hz (for example Kistler Pressure Sensor, Type 6031).

Additionally, mechanical vibration sensing devices 33,35 may be mounted at the housing 24. These mechanical vibration sensing devices 33,35 additionally provide the possibility of observing a mechanical excitation status of the housing 24. Although not illustrated, the respective signals delivered from these sensors may be evaluated in the same way and by corresponding devices as illustrated later on for the signals delivered from the pressure sensors, thus giving an additional opportunity in monitoring and controlling the compressor.

Figure 3:
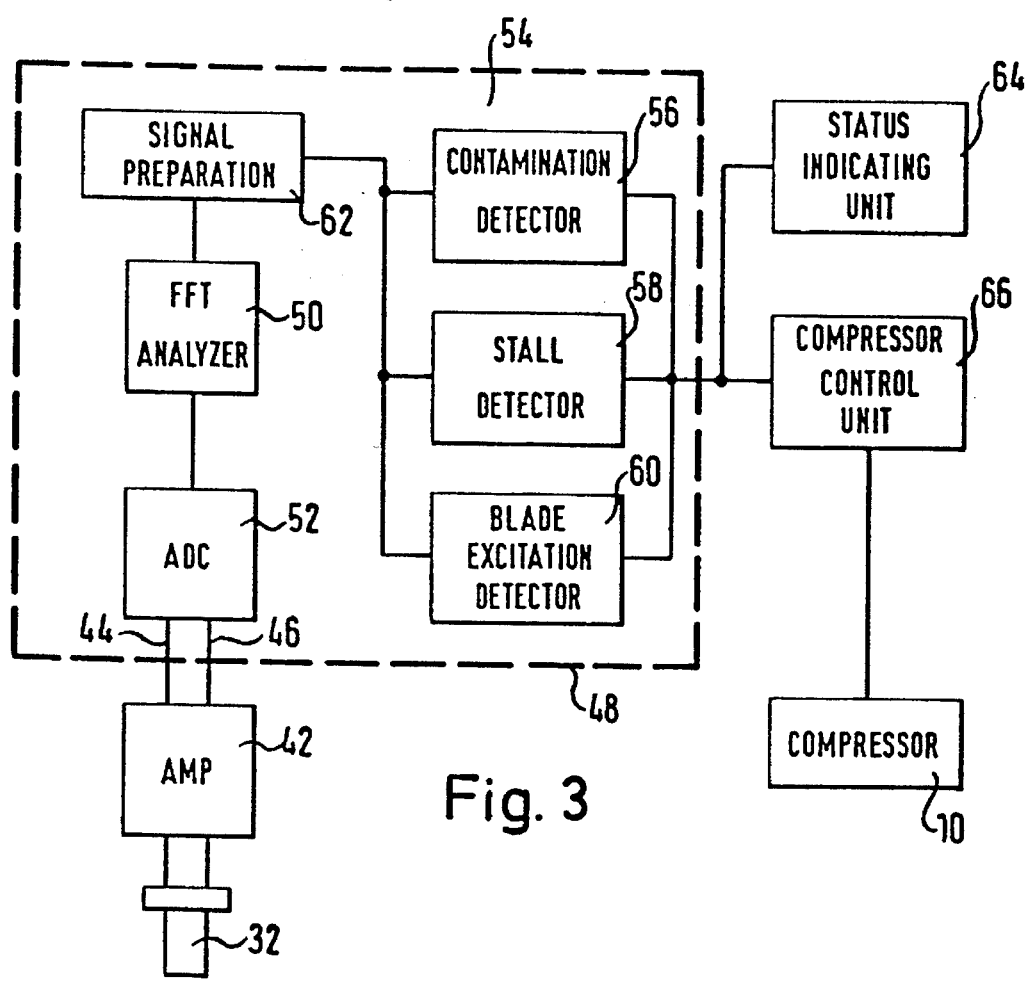
FIG. 3 is a block diagram of the dynamic pressure probe connected to an evaluation unit.

As shown in FIGS. 2 and 3, the sensor is provided with an amplifier 42, amplifying the respective sensor signal. The amplifier 42 is connected via lines 44,46 to an evaluation unit 48.

As shown in FIG. 3, the evaluation unit 48 contains a fast Fourier transformer (FFT) analyzer 50 which receives signals from amplifier 42 through an analog digital converter ADC (or multiplexer) 52 which is connected between the amplifier 42 and the FFT analyzer 50.

The signals from the FFT analyzer are transmitted to a computer unit 54, comprising several subunits, amongst them a blade excitation detector 60. Besides this blade excitation detector 60 further detectors for the status of the compressor may be installed, for example a stall detector 58 for monitoring the operational status of the compressor 10 and a contamination detector 56 for detecting fouling of the compressor 10. However, the excitation monitoring, according to the present invention, may also be performed independently of stall detection and fouling detection.

In order to facilitate the computing of the frequency signals output from the FFT analyzer 50, a unit 62 for signal preparation may be connected between the FFT analyzer 50 and the detectors 56,58,60. The unit 62 contains filter algorithms for handling and smoothing digital data as received from the FM analyzer. The resulting frequency signals from the FM analyzer, after smoothing via unit 62, are forwarded to said detectors 56,58,60 for comparison with respective reference patterns. If the comparison analyzers indicate deviations beyond a predetermined allowable threshold, the computed evaluation is transmitted to a status indicating unit 64 to indicate contamination or stall or blade excitation. Thus, the operation and status of compressor 10 can be monitored.

Independent of this monitoring, it is further possible to use the computed evaluation for controlling purposes. A respective compressor control unit 66, connected to the evaluation unit 48, is also shown in FIG. 3 serving for controlling the compressor 10. In case of an unnormal status of the compressor, detected by one of the detectors 56,58,60, the compressor control unit 66 takes measures to avoid the risk of damaging the compressor 10, for example by lowering the load (adjustment of orientation of blades by means of gear box 30) or by reducing the fuel injection rate of the combustion engine to reduce the rotational speed. In some instances, the compressor control unit 66 may stop the compressor 10.

A general parts and components list for making, installing, and using the present invention is presented in Table 1. The vendor identifier in Table 1 references the information given in Table 2, which identifies the vendor's address for each vendor identifier.

TABLE 1

| Description | | Vendor |
| --- | --- | --- |
| Dyn. press sensor | 6031 | KIST |
| Dyn. press sensor | 6001 | KIST |
| Mounting nuts and conn.nipples | 6421 | KIST |
| Mounting nuts and conn.nipples | 6421 | KIST |
| Mounting nuts | 6423 | KIST |
| Kable | 1951A0.4 | KIST |
| Kable | 1631C10 | KIST |
| Amplifier | Y5007 | KIST |
| Isolation transformer | T4948 | HAUF |
| Multipair twisted cable | | |
| Vibration pick up | 306A06 | PCB |
| Kable | 1631C10 | KIST |
| Transducer 12 channel | F483B03 | PCB |
| CRF-Vib signal 0–10 V | | VIBR |
| Low press Rotor speed | | GE |
| High press Rotor speed | | GE |
| Isolation Aplifier | EMA U-U | WEID |
| Centronics connector | | |
| Relay | 116776 | WEID |
| Industrial computer | BC24 | ACTI |
| CPU 80386/20 Mhz | | |
| Math coprocessor 80387 | | |
| RAM = 1 MB | | |
| 20 MB HD | | |
| EGA | | |
| Power supply 28 V DC | | |
| 5 free 16 Bit Slots/AT-Bus | | |
| DOW 3.3 | | |
| Spectral Analyser | V5.x | STAC |
| LAN Network board | 3C501 | 3COM |
| 2 MB RAM/ROM Board | | DIGI |
| EGA Monitor 14" | | |
| Keyboard for AT-PC | | |
| Instrument Rack | | KNUR |
| VMS Operating System | | DEC |
| Operator Interface and General Purpose Computer | | |
| Microvax 11 Computer with 9 MB, RAM, hard disk drive of 650 megabytes storage capacity | | DEC |
| TEK H207 monitor | | TEK |

TABLE 2

| Vendor | Address |
| --- | --- |
| ACTI | ACTION Instruments, Inc.<br>8601 Aero Drive<br>San Diego<br>CA 92123 USA |
| DIGI | Digitec Engineering GmbH<br>D-4005 Meerbusch, Germany |
| GE | General Electric Co.<br>1 Neumann Way<br>Mail Drop N-155<br>US Cincinnati OHIO |
| KIST | Kistler Instrumente GmbH<br>Friedrich-List-Strasse 29<br>D-73760 Ostfildern, Germany |
| KNUR | Knuerr AG<br>Schatzbogen 29<br>D-8000 Meunchen 82, Germany |
| PCB | PCB Piezotronics Inc.<br>3425 Walden Avenue<br>Depew<br>New York |
| VIBR | Vibro meter SA<br>Post Box 1071<br>CH-1701 Fribourg, Germany |
| WEID | Weidmueller GmbH & Co.<br>PF3030<br>D-4930 Detmold, Germany |
| DEC | DIGITAL Equipment Corp.<br>Maymond, Massachusetts |
| TEK | Tektronics<br>P.O. 1000<br>Wilsonville, Oregon 97070-1000 |

In detectors 56,48,60, the smoothed frequency signal is evaluated, said frequency signal being indicative of the amplitudes of frequency components of the respective sensor signal in a respective frequency interval.

Figure 4:
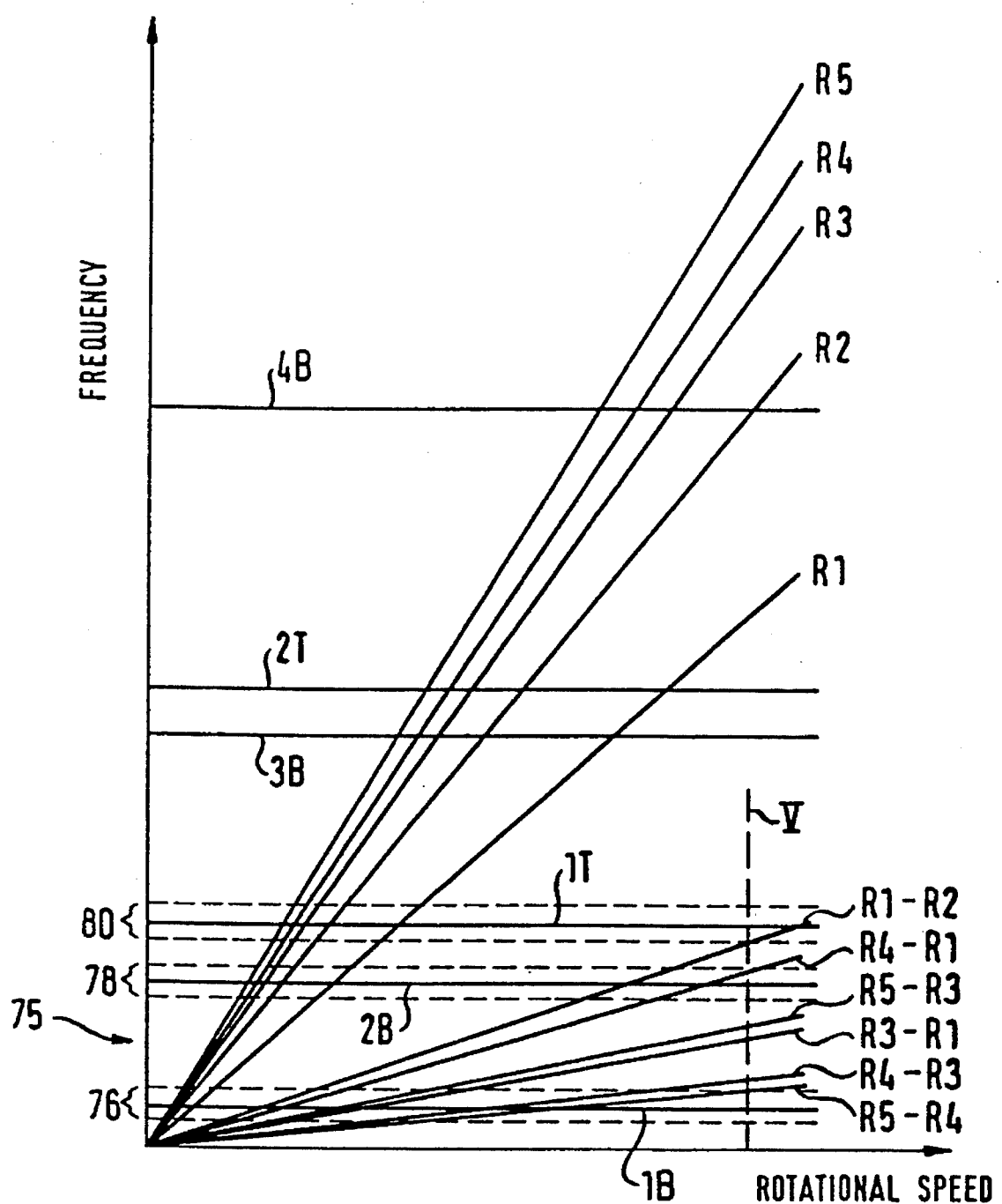
FIG. 4is a Campbell diagram showing the torsional and bending resonance frequencies of a stage of a compressor as well as the excitation frequencies occurring in a compressor as a function of the rotational speed of the compressor.

As an example of the practical use of the invention, FIG. 4 shows a Campbell diagram for a compressor stage (fourth stage) lying in the high pressure part of a compressor (General Electric Aeroderivative LM 5000), with abscissa indicating a rotational speed of the compressor and ordinate indicating the vibration frequencies. Several critical resonance frequencies of mechanical blade vibrations are indicated with horizontal lines. These frequencies correspond to the first bending excitation (frequency 1B) and first torsional excitation (frequency IT) of the blades of this stage as well as higher harmonics of these excitations (2B, 3B, 4B; 2T). Further lines with a constant gain indicate frequencies of pressure fluctuations of the air flowing through the compressor. The primary pressure fluctuations are due to the wake regions at the downstream edge of each of the rotor blades which rotate with the rotor. Thus, their frequency is the present characteristic frequency (product of the number of rotor blades and present rotational speed of the rotor). The lines RI to R5 correspond to the primary pressure fluctuations. The primary pressure fluctuations of the rotor stages interact with one another, thus producing secondary pressure fluctuations with the common known beat frequencies (sum value and difference value of the frequencies of the interacting primary pressure fluctuations). In FIG. 4, some lines indicative of the lowest beat frequencies, depicted as lines R1-R2, R4-R1, R5-R3, R4-R3 and R5-R4, correspond to the secondary pressure fluctuations with the difference frequencies of the respective interacting primary pressure fluctuations (characteristic frequency of the first stage minus characteristic frequency of the second stage etc.)

According to FIG. 4, in a low frequency range 75, containing the first and second bending excitation (1B,2B) and the first torsional excitation (1T) of the blades, the highest density of excitation frequencies occurs over the whole region of the rotational speed of the compressor. Thus, there is a high probability that resonance blade excitations are induced within this frequency range 75 in the whole operating speed range of the compressor.

Figure 5:
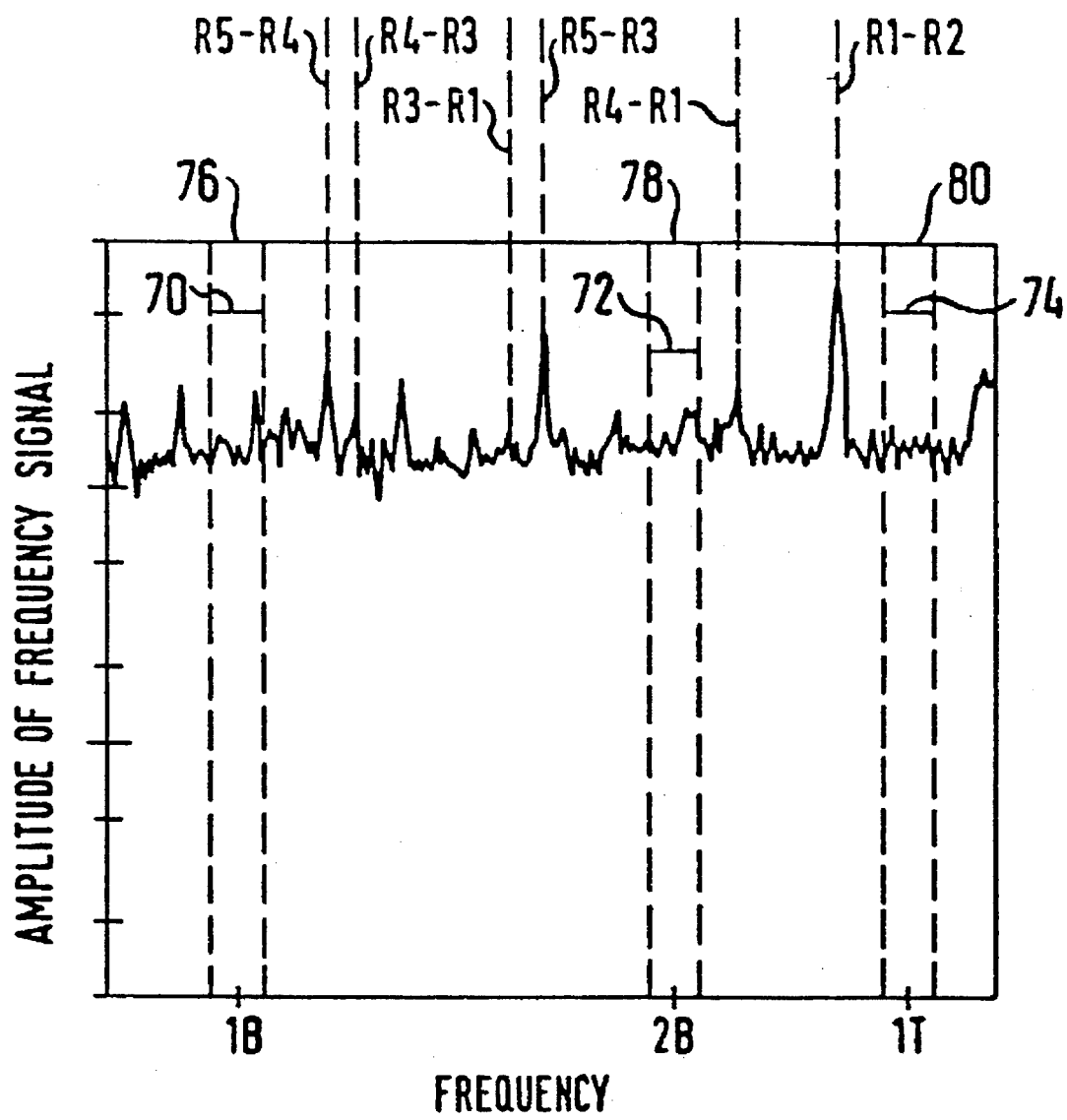
FIG. 5 shows a frequency signal containing several excitation peaks.

Accordingly, the frequency signal is preferably observed in this low frequency region with respective occurrence of pressure fluctuations with critical frequencies corresponding to certain resonance frequencies of the blades. In the region of each of the critical frequencies (1B, 2B, 1T), a predetermined frequency range 76,78,80 is set. During the monitoring of the vibrational excitation of the compressor, the signals are analyzed to determine the existence of frequency components in these predetermined ranges 76,78, 80. A value, indicative of the height of a peak lying in one of these predetermined frequency ranges 76,78,80, is derived and monitored for an increase in its height. When performing the measurement leading to FIG. 5, the rotational speed was set to a value indicated by line V in FIG. 4. In FIG. 5, a frequency signal is illustrated, containing excitation peaks R5–R4, R4-R3, R3-R1, R5-R3, R4-R1, R1-R2 corresponding to the secondary pressure fluctuations, shown in FIG. 4 as lines R5-R4, R4-R3, R3-R1, R5-R3, R4-R1, R1-R2. The frequency ranges 76,78,80 correspond to the respective frequency ranges in FIG. 4. For each of the predetermined frequency ranges 76,78,80 a predetermined threshold value 70,72,74 is set. These predetermined threshold values 70,72, 74 may be different for each of the critical resonance frequencies of the rotor components, because the danger of causing damage to the rotor components may be different for different resonance vibrational excitations. If during the operation of the compressor at least one of the excitation peaks R5-R4, R4-R3, R3-R1, R5-R3, R4-R1, R1-2 shifts into one of the predetermined frequency ranges 76,78,80 and if the height of this at least one excitation peak exceeds the corresponding threshold value 70,72 and 74, respectively, a status change signal is generated by the blade excitation detector and is delivered to the status indicating unit 64, thus indicating the appearance of dangerous pressure fluctuations in the air flowing through the compressor.

Thus, during the monitoring of the vibrational excitation of a compressor, the occurrence of pressure fluctuations in the air flowing through the compressor is observed. The threshold values for pressure fluctuations in the region of critical frequencies may be set to very low values, thus being able to indicate the appearance of pressure fluctuations having frequencies in the range of a critical frequency before any excitations of compressor components can take place.

The detection of such excitation frequencies may also be used for closed loop control of the compressor. If the measured height of the at least one excitation peak exceeds the corresponding threshold value in the region of a critical resonance frequency, the compressor control unit 66 receives the respective control signal in order to increase or decrease the rotational speed of the compressor to leave an operational status wherein one of the excitation frequencies, depending on the rotational speed as shown in FIG. 4, equals an excitation resonance frequency of the rotor components.

The discussion respecting FIGS. 6, 7, and 8 presents a detailed description of the adaptor for the preferred pressure measuring system used in the present invention.

The invention relates to an adaptor for mounting a gas pressure sensor to a wall of a housing of a high temperature system, such as a gas turbine or a chemical reactor, for example plug flow reactor.

The elongated sensor carrier provides for the necessary temperature gradient between the hot wall at one end of said carrier means and the pressure sensor at the other end thereof. The tube means connecting the interior of the housing with the pressure sensor has a well-defined, frequency-dependent flow resistance for the gas flow through the tube means. Therefore, accurate and reliable pressure measurements can be performed. The tube means are ready available with high precision inner surface required for well-defined flow resistance. Thin-walled tube means may be used since the mechanical stability of the adaptor is provided by the separate sensor carrier means. By choosing a tube means with tube means length and tube means diameter being determined such that only a very small fluid volume is defined within the adaptor, high frequency pressure variations within housing with frequencies up to 10.000 Hz and higher may be detected by the pressure sensor.

In a preferred embodiment the carrier means comprises at said one end thereof a first threaded end portion to be secured in the hole of the wall, for example in a borescope hole of a gas turbine wall, said tube means being fastened to said first end portion in the region of said one end of said tube means. Thus, the common borescope holes of the gas turbine can be used for mounting the pressure sensor. No further holes have to be drilled into the gas turbine wall.

Said carrier means may comprise at said other end thereof a second end portion provided with said recess, said tube means being fastened to said second end portion in the region of said other end of said tube means. In this way, most of the length of the carrier means between said first and said second end thereof is used for producing the temperature gradient. This ensures a relatively compact construction.

Furthermore, said carrier means may comprise a middle portion connecting said first and said second end portion, said middle portion having no direct contact with said tube means. This separation of tube means and carrier means ensures rapid cooling, especially when using a preferred embodiment of the invention, wherein said middle portion is formed by a hollow cylindrical shaft having a cylinder axis extending along said axis of elongation, said tube means extending through said middle portion along said cylinder axis with clear distance between said tube means and said shaft. The hollow cylindrical space between said tube means and said wall provides for additional cooling especially in case of said shaft being provided with at least one hole for allowing entrance and exit of cooling fluid to the outer surface of said tube means.

For rapid cooling, it is possible to circulate cooling gas or cooling liquid through said hollow cylindrical space. However, if at least two elongated holes are provided, each with an axis of elongation extending parallel to the cylinder axis, the cooling by air entering into and exiting from the respective one of the two elongated holes, may suffice. The regular cooling air for cooling the housing of high temperature systems, for example the gas turbine wall, may also be used for cooling the adaptor without additional measures.

An outer diameter of said hollow cylindrical shaft may not be greater than two thirds of an outer diameter of said second end portion in order to obtain a high temperature gradient since less raw material is used. Furthermore, the mounting space needed for the adaptor is reduced which is important, since at the outside of the gas turbine wall there is an actuator system with many rods for actuating turbine elements, especially turbine blades.

In order to facilitate the mounting of the adaptor, said first end portion is provided with a polygonal section for engagement with a screwing tool.

Said carrier means and said tube means may comprise steel alloy parts having high mechanical strength and high temperature resistance.

The best results were obtained with V4A-steel alloy. This material has nearly the same thermal expansion coefficient as the commonly used material of the gas turbine wall, so that leakage problems due to different thermal expansion are avoided.

Preferred dimensions of the tube means are an inner diameter between 0.4 mm and 1.2 mm and a tube length between 20 mm and 100 mm. The best results are obtained with an inner diameter of approximately 1 mm and a tube length of approximately 50 mm.

It was found that the ratio of the tube length value of the tube means and the value of the inner diameter of the tube means are decisive for the transmission characteristics of the tube for high frequency pressure variations. Tubes with the same ratio essentially exhibit the same transmission characteristics. Good results were obtained with a ratio between 20 and 80. Best results were obtained with a ratio of approximately 50.

In order to obtain a high temperature resistance with sufficient mechanical strength of the tube, the thickness of the tube wall should be between 0.2 and 0.8 mm.

The transmission characteristics of the adaptor, that is the attenuation of the sensor signal with increasing frequency of the pressure variations with constant amplitude may be determined experimentally by means of a calibrating device. For this aim, the adaptor may be mounted to a reference pressure source with a variable pressure pulse frequency.

It was found that the transmission characteristics of the tube means may be approximated by the following formula for the ratio of the absolute pressure P2 at the other end of the tube means and the absolute pressure P1 at the one end of the tube means:

$$P2/P1 = a * f^b * e^{f*c}$$

with the pressure P1 at the one end of said tube means varying with a frequency f[Hz] and constants a, b and c depending on the dimensions of the tube means.

A set of parameters a, b, c may be determined for a given ratio of the value of the tube length and the value of the inner diameter by theoretical calculation or by using the aforementioned calibrating method. To determine the set of parameters, only a small sample of measurements, at least three measurements at three different frequencies, have to be performed. After determination of the set of parameters for a given ratio, the transmission characteristics of tube means with this ratio, but with different length and diameter, may be described by the above formula.

For a ratio of the value of the tube means length and the value of the inner diameter of approximately 50, the set of parameters shows the following values: a =0.416; b =−0.003; c =−0.000186.

The invention relates further to a pressure sensing device for measuring dynamic pressure variations within a gas turbine, comprising an adaptor as described above and a piezoelectric or piezoresistive pressure sensor mounted to said adaptor. Piezoelectric and piezoresistive pressure sensors generally are only operable at relatively low temperatures. On the other hand, piezoelectric and piezoresistive pressure sensors produce signals representing only the dynamic part of the pressure within the gas turbine. For many diagnoses and monitoring methods this dynamic pressure part is of main interest. Therefore, the pressure sensing device as mentioned before, is advantageous for these applications.

Referring to the drawings, wherein equal numerals correspond to equal elements throughout, first, reference is made to FIG. 6, wherein an adaptor 110 equipped with a pressure sensor 32 is mounted to a wall 36 of a gas turbine. The wall 36 is partly broken. The lower side 34 in FIG. 6 of wall 36 defines an interior (inner) space 120 of the gas turbine, in which inner space a gas turbine rotor with blades 16 (in FIG. 6 partly shown) is rotating. The rotating blades 16 are cooperating with not shown static blades mounted to the wall 36. The adaptor 110 is preferably mounted in the region of the gap between stator blades and rotor blades of one stage of the gas turbine.

It is not necessary to drill a hole into wall 36 for mounting the pressure sensor because the pressure sensor may be mounted to the known borescope holes 40 which are used for visual inspection of the interior of the gas turbine by an endoscope device.

For this purpose, the adaptor 110 is provided with a threaded end portion 124 with a screwed section 124a to be screwed into the borescope hole 40. The first end portion 124 is further provided with a polygonal section 124b which is also shown in FIG. 10. To assure stability of the end portion 124, the polygonal section 124b is followed by a cylindrical section 124c.

The adaptor 110 is elongated with an axis of elongation 126 extending between the mentioned first end portion 124 and a second end portion 128. The axis of elongation 126 coincides with the axis of the borescope hole 40. Said second end portion 128 is provided with a recess 130 for sealingly receiving a sensor head 132 of said pressure sensor 32. Said recess 130 is arranged concentrically to said axis of elongation 126 and opens into the radial end face 133 of the second end portion 128. Starting from said opening, said recess is formed by a threaded section 130a for receiving the correspondingly threaded section 132a of said sensor head 132. The threaded section 130a is followed by two stepped cylindrical sections 130b and 130c for receiving corresponding cylindrical sections 132b and 132c of the sensor head 132.

At the radial end face 132d of the sensor head, a central opening 132e for entrance of pressure fluid into the sensor head, is indicated by dashed lines in FIG. 6. A central fluid channel 134 of said adaptor 110, extending along said axis 126 between a radial end face 136 of the first end portion 124 and a radial end face 130e of said recess 130 opens into the recess 130 adjacent said hole 132e of the sensor 32. The sensor head is fitted into said recess 130 with only very small distance or clearance between said recess 130 and said sensor head so that there is only a very small (lost) volume of pressure fluid to enter into said space between sensor head 132 and recess 130. In case of the thermal expansion coefficients of the pressure head and of the material of the adaptor 110 being almost identical, it is also possible to fit said pressure head into said recess 130 with almost no clearance between the circumferential faces and the radial end faces 130e, 132d to further reduce the lost volume of pressure fluid. A very small lost volume is necessary for enabling the measurement of very high frequent pressure variations. A larger lost volume would dampen high frequency pressure variations.

The sensor 32 is sealingly mounted to adaptor 110 in the usual manner, either by employing rubber-sealing rings or metallic-sealing rings (not shown) or by using sealing edges.

The adaptor 110 consists of two main parts, namely a carrier means generally designated with numeral 140 and tube means in the shape of a single tube 142. The carrier means 140 may be of one-part construction or of the shown two-part construction with a lower part 143 and an upper part 144. The lower part 143 consists of the above-mentioned first end portion 124 and a middle portion 146 with reduced outer diameter D1 (8 mm) as compared to the outer diameter D2 (14 mm) of the cylindrical section 124c of the first end portion 124 and also with respect to the outer diameter D3 (12 mm) of the second end portion 128.

The middle portion 142 is formed by a hollow cylindrical shaft extending along said axis 126. The diameter D4 of the central hole 148 is 6 mm and the outer diameter D1 is 8 mm as compared to outer diameter D5 of the tube 142 of 1.1 mm, with an inner diameter D6 of 1 mm. The cross section of tube 142 is shown in enlarged manner in FIG. 7. The tube length is 49 mm. The ratio of the value of the tube length and the value of the inner diameter D6 therefore is 50. This value defines the transmission characteristics of the tube for high frequency pressure fluctuations as will be described later on. The wall thickness of tube 142 defines the mechanical stability and the temperature resistance of the tube and lies between 0.2 to 0.8 mm with a preferred value of approximately 0.5 mm.

For an effective cooling of the adaptor, in order to reduce the temperature of the mounted sensor below 200 °C. with the temperature of wall 36 ranging up to 600 °C. (rear stages of a high pressure compressor of a gas turbine), the middle portion is provided with two opposing elongated holes 150, 152 extending parallel to the axis 126 over almost the whole length of the middle portion 146. The width D7 of each hole is approximately 4 mm with a hole length of 30 mm. These holes 150, 152 allow entrance and exit of cooling fluid, namely cooling air used for cooling the outer surface of the wall 36. The cooling air serves for cooling the outer surface of the tube 148 and the inner surface of the cylindrical shaft of the hollow cylindrical shaft forming the middle portion 146.

In order to enlarge the inner cooling surface of the adaptor the central bore 148 of the hollow shaft, forming the middle portion 146, extends into the first end portion 124 ending at half the axial length of the end portion 124. This measure also reduces the material cross-section of the adaptor 110 in this region so that the temperature resistance is increased.

At the lower end of the mentioned central bore 148, the first end portion is provided with a diameter-reduced central bore 154 which is adapted to the outer diameter of the tube 142. According to FIG. 6 the tube ends in the plane of the lower radial face 136 of the first end portion 124. The tube 142 is sealingly tight-fitted into said bore 154 in the usual manner (soldering, brazing, welding).

The upper end of the tube 142 is likewise sealingly tight-fitted into a respective hole 156 at the lower end of the second end portion 128. This hole 156 is followed up by a reduced diameter hole 158, which opens into the recess 130. Thus, the above-mentioned channel form connecting the interior 120 of the gas turbine with the opening 132e of the sensor 32 is established. The axial length of the hole 158 is only 2 mm and the diameter of said hole is 1 mm so that the fluid transmitting characteristics of said fluid channel 134 are mainly defined by the tube 142.

For mounting the parts of the adaptor 110, it is preferred to first secure the tube 142 to the first end section 128 and then to insert the free end of the tube 142 into the bore 154 which is facilitated by a conical surface 160 connecting the larger central bore 148 of said adaptor with the smaller diameter bore 154. During said insertion the free end of the middle portion 146 comes into engagement with a reduced diameter end section 130f at the lower end of the second end portion 128. The outer diameter thereof fits with the inner diameter D4 of the middle portion 146 so that soldering or welding both parts together in this region, results in a mechanically stable construction.

FIG. 8 shows a graph with the frequency f of pressure fluctuations at the entrance side of the adaptor (at the lower end of tube 142 in FIG. 6) with constant amplitude compared with the signal U outputted from the piezoelectric sensor 32 (for example Kistler Pressure Sensor Type 6031). The frequency is indicated in Hertz (Hz) and the sensor signal U in volts (V). The measurements were effected by means of a reference pulsating pressure source which the adaptor 110 with pressure 32 was mounted to.

The measurements were made in the region between 0Hz and 20.000 Hz. At a very low frequency around 0Hz, the sensor signal shows a value of slightly more than 1 V. When increasing the frequency, but keeping the amplitude constant, the value of signal U drops for example to 0.09 V at a frequency of 4000 Hz and to a value of 0.02 V at 20 000 Hz.

Solid line L in FIG. 8 is an approximation graph for the measured values. This line L is derived from the following formula:

$$P2/P1 = a * f^b * e^{f*c} \qquad (1)$$

wherein P1 is the absolute pressure at the entrance end of the tube

P2 is the absolute pressure at the inner end of the tube (more exactly at the upper end of short hole 158 following tube 142)

Constants a, b and c depend on the dimensions of the fluid channel 134, that is on the dimensions of tube 142 since the length of hole 158 is very short compared to the length of tube 142. For the described configuration with a tube length of 50 mm and a tube diameter of 1 mm, the constants have the following values:

a=0,416 b=−0,003 c=−0,000186.

Since constants b and c are negative, this formula (1) shows that with increasing frequency the pressure P2 is steadily decreasing with a respective decrease of the sensor signal U as shown in FIG. 8.

Using this formula, it is possible to calculate the attenuation of the sensor signal in dependence on the frequency of the pressure inside the housing for all adaptor configurations with the same ratio of the value of the channel length and the inner diameter thereof. It is not necessary to effect calibration measurements when using a reference pulsating pressure source.

Only in those cases where the fluid channel between the entrance side of the adaptor and the sensor has irregular inner surfaces, formula 1 cannot be used so that calibrating methods will have to be performed.

The adaptor as described above may also be used in connection with other high temperature systems like chemical reactors, for example plug flow reactor, with relatively high wall temperatures and dynamic gas pressure fluctuations within said housing to be measured.

The present invention has been described in an illustrative manner. In this regard, it is evident that those skilled in the art, once given the benefit of the foregoing disclosure, may now make modifications to the specific embodiments described herein without departing from the spirit of the present invention. Such modifications are to be considered within the scope of the present invention which is limited solely by the scope and spirit of the appended claims.

What is claimed is:

1. Process for controlling mechanical vibrations of rotor blades and stator blades in an axial compressor, said axial compressor comprising:

a rotor, a housing, an inlet where, in operation, gas enters at a first pressure, and an outlet where, in operation, gas exits at a second pressure higher than said first pressure, said rotor being rotatably mounted within said housing for rotation about a rotational axis, said axial compressor further comprising a plurality of axial compressor stages, each said axial compressor stage comprising:

a row of said rotor blades mounted on said rotor and being arranged one following the other in a circumferential direction with respect to said rotational axis, and a row of said stator blades mounted on said housing and being arranged one following the other in a circumferential direction with respect to said rotational axis, each said axial compressor stage having, in operation, a dynamic pressure field surrounding each said rotor in the region of said housing, each said axial compressor stage further having, in operation, a characteristic frequency defined as the product of the number of rotor blades mounted in said row of rotor blades and the rotational speed of said rotor, each said axial compressor stage further having, in operation, a primary rotor stage set of a plurality of primary pressure fluctuation frequencies defined at the rotational speed of said rotor wherein each primary pressure fluctuation frequency is respectively associated with the dynamic pressure influence of each said row of rotor blades in said axial compressor upon the dynamic pressure field of said axial compressor stage, each said axial compressor stage further having, in operation, a secondary beat set of secondary beat fluctuation frequencies and associated respective secondary threshold values defined at the rotational speed of said rotor wherein each secondary beat fluctuation frequency in the secondary beat set is respectively associated with the difference value of a unique combination of two said primary pressure fluctuation frequencies in the primary rotor stage set, each said axial compressor stage further having, in operation, a critical frequency set of at least one critical frequency wherein each critical frequency has an associated respective critical frequency threshold value and predetermined frequency range, said process comprising the following steps:

setting the rotational speed of said rotor to a known value; selecting a useful primary set of critical frequencies from the critical frequency set and selecting a useful secondary set of secondary beat fluctuation frequencies from the secondary beat set;

measuring the pressure fluctuations of at least one said dynamic pressure field with a pressure sensing means responsive at the characteristic frequency for the known value of rotational speed and generating thereby at least one sensor signal;

deriving a first plurality of frequency components from each sensor signal, wherein each frequency component has an associated frequency attribute and amplitude attribute and wherein each frequency component is derived at frequencies within a critical frequency range so that the first plurality of frequency components has at least one value respective to each critical frequency range in said useful primary set;

further deriving a secondary plurality of frequency components from each sensor signal, wherein each frequency component has a associated frequency attribute and amplitude attribute and wherein each frequency component is derived at one of the secondary beat fluctuation frequencies so that the second plurality of frequency components has a value respective to each secondary beat fluctuation frequency in said useful secondary set;

defining the status respecting mechanical vibrations of said rotor blades and said stator blades by comparing each amplitude attribute from each frequency component respective to each critical frequency in said useful primary set with said associated critical frequency threshold value respective to the same critical frequency and comparing each amplitude attribute from each frequency component respective to each secondary beat fluctuation frequency in said useful secondary set with said associated secondary threshold value respective to the same secondary beat fluctuation frequency to, in a first case, define a hazardous mechanical vibration status if any such comparing operation shows an amplitude attribute in excess of a respective threshold value and, in a second case, define an acceptable mechanical vibration status if no such comparing operation shows an amplitude attribute in excess of its respective threshold value for all frequency components respective to the critical frequencies in said useful primary set and for all frequency components respective to the secondary beat fluctuation frequencies in said useful secondary set; and using said hazardous mechanical vibration status and said acceptable mechanical vibration status in controlling said axial compressor.

2. Process according to claim 1, wherein at least one said critical frequency is defined as a torsional vibration basic frequency of said rotor and stator blades.

3. Process according to claim 2, wherein at least one said critical frequency is defined as a higher harmonic of said torsional vibration basic frequency of said rotor and stator blades.

4. Process according to claim 1, wherein at least one said critical frequency is defined as a bending vibration basic frequency of said rotor and stator blades.

5. Process according to claim 4, wherein at least one said critical frequency is defined as a higher harmonic of said bending vibration basic frequency of said rotor and stator blades.

6. Process according to claim 1, wherein at least one mechanical vibration sensing device is mounted at said housing detecting a mechanical vibration excitation of said housing and wherein a second status change signal is generated, indicative of an excess excitation status of said housing in case of said mechanical vibration sensing device detecting an excess vibrational excitation status of said housing, said second status change signal also being used for controlling said axial compressor.

7. Process according to claim 6, wherein said at least one mechanical vibration sensing device is located, in a first case, near said inlet and, in a second case, near said outlet.

8. Process according to claim 1, wherein said pressure sensing means comprises a piezoresistive pressure sensor.

9. Process for measuring mechanical vibrations of rotor blades and stator blades in an axial compressor, said axial compressor comprising:

a rotor, a housing, an inlet where, in operation, gas enters at a first pressure, and an outlet where, in operation, gas exits at a second pressure higher than said first pressure, said rotor being rotatably mounted within said housing for rotation about a rotational axis, said axial compressor further comprising at least one axial compressor stage, each said axial compressor stage comprising:

a row of said rotor blades mounted on said rotor and being arranged one following the other in a circumferential direction with respect to said rotational axis, and a row of stator blades mounted on said housing and being arranged one following the other in a circumferential direction with respect to said rotational axis, each said axial compressor stage having, in operation, a dynamic pressure field surrounding each said rotor in the region of said housing, each said axial compressor stage further having, in operation, a characteristic frequency defined as the product of the number of rotor blades mounted in said row of rotor blades and the rotational speed of said rotor, said process comprising the following steps:

setting the rotational speed of said rotor to a known value;

measuring the pressure fluctuations of at least one said dynamic pressure field with a pressure sensing means responsive at the characteristic frequency for the known value of rotational speed and generating thereby at least one sensor signal;

deriving a plurality of frequency components from each sensor signal, wherein each frequency component has an associated frequency attribute and an associated amplitude attribute as a value pair; and combining the plurality of associated frequency attribute and associated amplitude attribute value pairs respective to said plurality of frequency components to establish a set of associated frequency attribute and associated amplitude attribute value pairs characterizing the measurement of mechanical vibrations of said rotor and stator blades at said known value of rotational speed.

10. Process according to claim 9, wherein said pressure sensing means is connected to said housing between the rotor blades and the stator blades of one of said axial compressor stages.

11. Process according to claim 9, wherein said plurality of frequency components are derived by fast Fourier transformation (FFT).

12. Process according to claim 9, wherein said plurality of frequency components are derived by fast Hartley transformation (FHT).

13. Process according to claim 9, wherein said pressure sensing means comprises a piezoelectric pressure sensor.

14. Process according to claim 9, wherein each said frequency attribute is between 0 Hz–20000 Hz.

15. Process according to claim 14, wherein each said frequency attribute is between 100 HZ–2000 Hz.

16. Process according to claim 9, wherein said pressure sensing means comprises a piezoresistive pressure sensor.

17. Computer implemented system for measuring mechanical vibrations of rotor blades and stator blades in an axial compressor, said axial compressor comprising:

a rotor, a housing, an inlet where, in operation, gas enters at a first pressure, and an outlet where, in operation, gas exits at a second pressure higher than said first pressure, said rotor being rotatably mounted within said housing for rotation about a rotational axis, said axial compressor further comprising at least one axial compressor stage, each said axial compressor stage comprising:

a row of said rotor blades mounted on said rotor and being arranged one following the other in a circumferential direction with respect to said rotational axis, and a row of said stator blades mounted on said housing and being arranged one following the other in a circumferential direction with respect to said rotational axis, each said axial compressor stage having, in operation, an associated dynamic pressure field surrounding each said rotor in the region of said housing, each said axial compressor stage further having, in operation, a characteristic frequency defined as the product of the number of rotor blades mounted in said row of rotor blades and the rotational speed of said rotor, said computer implemented system comprising:

a compressor control unit for setting the rotational speed of said rotor to a known value;

pressure sensing means responsive at said characteristic frequency for measuring the pressure fluctuations of at least one said dynamic pressure field with for the known value of rotational speed and generating thereby at least one sensor signal; and an evaluation unit for deriving a plurality of frequency components from each sensor signal, wherein each frequency component has an associated frequency attribute and an associated amplitude attribute as a value pair, and for combining the plurality of associated frequency attribute and associated amplitude attribute value pairs respective to said plurality of frequency components to establish a set of associated frequency attribute and associated amplitude attribute value pairs characterizing the measurement of mechanical vibrations of said rotor and stator blades at said known value of rotational speed.

18. Computer implemented system according to claim 17, wherein said pressure sensing means is connected to said housing between the rotor blades and the stator blades of one of said axial compressor stages.

19. Computer implemented system according to claim 17, wherein said pressure sensing means comprises a piezoelectric pressure sensor.

20. Computer implemented system according to claim 17, wherein said evaluation unit comprises a fast Fourier transformation unit.

21. Computer implemented system according to claim 17, wherein said evaluation unit comprises a fast Hartley transformation unit.

22. Computer implemented system according to claim 17, wherein at least one mechanical vibration sensing device is mounted at said housing.

23. Computer implemented system according to claim 22, wherein said at least one mechanical vibration sensing device is located, in a first case, near said inlet and, in a second case, near said outlet.

24. Computer implemented system according to claim 22, wherein a signal evaluation unit is connected to said mechanical vibration sensing device, generating a second status change signal in case of housing being in an excess vibrational excitation status.

25. Computer implemented system according to claim 24, wherein a status indicating unit is provided, receiving said second status change signal and indicating the respective operational status of said axial compressor.

26. Computer implemented system according to claim 17, wherein said pressure sensing means comprises a piezoresistive pressure sensor.

27. Computer implemented system for controlling mechanical vibrations of rotor blades and stator blades in an axial compressor, said axial compressor comprising:

a rotor, a housing, an inlet where, in operation, gas enters at a first pressure, and an outlet where, in operation, gas exits at a second pressure higher than said first pressure, said rotor being rotatably mounted within said housing for rotation about a rotational axis, said axial compressor further comprising at least one axial compressor stage, each said axial compressor stage comprising:

a row of said rotor blades mounted on said rotor and being arranged one following the other in a circumferential direction with respect to said rotational axis, and a row of said stator blades mounted on said housing and being arranged one following the other in a circumferential direction with respect to said rotational axis, each said axial compressor stage having, in operation, an associated dynamic pressure field surrounding each said rotor in the region of said housing, each said axial compressor stage further having, in operation, a primary rotor stage set of a plurality of primary pressure fluctuation frequencies defined at the rotational speed of said rotor wherein each primary pressure fluctuation frequency is respectively associated with the dynamic pressure influence of each said row of rotor blades in said axial compressor upon the dynamic pressure field of said axial compressor stage, each said axial compressor stage further having, in operation, a secondary beat set of secondary beat fluctuation frequencies and associated respective secondary threshold values defined at the rotational speed of said rotor wherein each secondary beat fluctuation frequency in the secondary beat set is respectively associated with the difference value of a unique combination of two said primary pressure fluctuation frequencies in the primary rotor stage set, each said axial compressor stage further having, in operation, a critical frequency set at least one critical frequency wherein each critical frequency has an associated respective critical frequency threshold value and predetermined frequency range, each axial compressor stage further having, in operation, a characteristic frequency defined as the product of the number of rotor blades mounted in said row of rotor blades and the rotational speed of said rotor, said computer implemented system comprising:

a compressor control unit for setting the rotational speed of said rotor to a known value;

pressure sensing means responsive at said characteristic frequency for measuring the pressure fluctuations of at least one said dynamic pressure field for the known value of rotational speed and generating thereby at least one sensor signal; and an evaluation unit, having a useful primary set of critical frequencies from the critical frequency set and a useful secondary set of secondary beat fluctuation frequencies from the secondary beat set, for deriving a first plurality of frequency components from each sensor signal, wherein each frequency component has an associated frequency attribute and amplitude attribute and wherein each frequency component is derived at frequencies within a critical frequency range so that the first plurality of frequency components has at least one value respective to each critical frequency range in said useful primary set, further deriving a second plurality of frequency components from each sensor signal, wherein each frequency component has an associated frequency attribute and an amplitude attribute and wherein each frequency component is derived at one of the secondary beat fluctuation frequencies so that the second plurality of frequency components has a value respective to each secondary beat fluctuation frequency in said useful secondary set, and defining the status respecting mechanical vibrations of said rotor blades and said stator blades by comparing each amplitude attribute from each frequency component respective to each primary pressure fluctuation critical frequency in said useful primary set with said associated critical frequency threshold value respective to the same critical frequency and comparing each amplitude attribute from each frequency component respective to each secondary beat fluctuation frequency in said useful secondary set with said associated secondary threshold value respective to the same secondary beat fluctuation frequency to, in a first case, define a hazardous mechanical vibration status if any such comparing operation shows an amplitude attribute in excess of a respective fluctuation threshold value and, in a second case, define an acceptable mechanical vibration status if no such comparing operation shows an amplitude attribute in excess of its respective fluctuation threshold value for all frequency components respective to the critical frequencies in said useful primary set and for all frequency components respective to the secondary beat fluctuation frequencies in said useful secondary set, and for sending said hazardous mechanical vibration status and said acceptable mechanical vibration status to said compressor control unit for use in controlling said axial compressor.

28. Computer implemented system according to claim 27, wherein said pressure sensing means is connected to said housing between the rotor blades and the stator blades of one of said axial compressor stages.

29. Computer implemented system according to claim 27, wherein said pressure sensing means comprises a piezoelectric pressure sensor.

30. Computer implemented system according to claim 27, wherein said evaluation unit comprises a fast Fourier transformation unit.

31. Computer implemented system according to claim 27, wherein said evaluation unit comprises a fast Hartley transformation unit.

32. Computer implemented system according to claim 27, wherein at least one mechanical vibration sensing device is mounted at said housing.

33. Computer implemented system according to claim 32, wherein said at least one mechanical vibration sensing device is located, in a first case, near said inlet and, in a second case, near said outlet.

34. Computer implemented system according to claim 32, wherein a signal evaluation unit is connected to said mechanical vibration sensing device, generating a second status change signal in case of said housing being in an excess vibrational excitation status.

35. Computer implemented system according to claim 34, wherein a status indicating unit is provided, receiving said second status change signal and indicating the respective operational status of said axial compressor.

36. Computer implemented system according to claim 35, wherein a second controlling unit is provided being supplied with said second status change signal for operational control of said axial compressor.

37. Computer implemented system according to claim 35, wherein said second status change signal is also used by said compressor control unit for operational control of said axial compressor.

38. Computer implemented system according to claim 27, wherein said pressure sensing means comprises a piezoresistive pressure sensor.

39. Computer implemented system according to claim 27, wherein at least one said critical frequency is defined as a torsional vibration basic frequency of said rotor and stator blades.

40. Computer implemented system according to claim 39, wherein at least one said critical frequency is defined as a higher harmonic of said torsional vibration basic frequency of said rotor and stator blades.

41. Computer implemented system according to claim 27, wherein at least one said critical frequency is defined as a bending vibration basic frequency of said rotor stator blades.

42. Computer implemented system according to claim 41, wherein at least one said critical frequency is defined as a higher harmonic of said bending vibration basic frequency of said rotor and stator blades.

\* \* \* \* \*

UNITED STATES PATENT AND TRADEMARK OFFICE
CERTIFICATE OF CORRECTION

PATENT NO. : 5,541,857
DATED : July 30, 1996
INVENTOR(S) : Hilger A. Walter, Herwart Honen, Heinz E. Gallus It is certified that error appears in the above-indentified patent and that said Letters Patent is hereby corrected as shown below:

Column 11, line 34, "$P2/P1=a*f^{b*}e^{f*c}$" should read -- $P2/P1=a*f^{b}*e^{f*c}$ --.

Signed and Sealed this

Seventeenth Day of June, 1997

*Attest:*

BRUCE LEHMAN

*Attesting Officer*     *Commissioner of Patents and Trademarks*